United States Patent
Wang

(10) Patent No.: US 11,580,558 B2
(45) Date of Patent: Feb. 14, 2023

(54) DYNAMIC ANTI-COUNTERFEIT SYSTEM AND METHOD

(71) Applicant: Focus Universal Inc., Ontario, CA (US)

(72) Inventor: Desheng Wang, Diamond Bar, CA (US)

(73) Assignee: Focus Universal Inc., Ontario, CA (US)

( * ) Notice: Subject to any disclaimer, the term of this patent is extended or adjusted under 35 U.S.C. 154(b) by 112 days.

(21) Appl. No.: 16/785,450

(22) Filed: Feb. 7, 2020

(65) Prior Publication Data

US 2021/0248620 A1  Aug. 12, 2021

(51) Int. Cl.
*G06Q 30/00* (2012.01)
*G06Q 30/018* (2023.01)

(52) U.S. Cl.
CPC ................... *G06Q 30/018* (2013.01)

(58) Field of Classification Search
CPC .. G06Q 30/018; G06Q 20/385; G06Q 20/341; G06Q 20/34; G06Q 20/40; G06Q 30/0185; G06K 7/1413
USPC ................................................. 705/318, 347
See application file for complete search history.

(56) References Cited

U.S. PATENT DOCUMENTS

| | | | |
|---|---|---|---|
| 4,405,829 A * | 9/1983 | Rivest | H04L 9/302 380/255 |
| 5,991,411 A | 11/1999 | Kaufman et al. | |
| 6,062,481 A | 5/2000 | Storch et al. | |
| 6,112,187 A * | 8/2000 | Fukawa | G06Q 20/206 705/18 |
| 7,710,269 B2 | 5/2010 | Reep | |
| 7,726,567 B2 | 6/2010 | Clarke et al. | |
| 8,978,969 B2 | 3/2015 | Chen et al. | |
| 9,256,881 B2 | 2/2016 | Engels et al. | |
| 10,043,153 B2 | 8/2018 | Fan et al. | |
| 10,115,068 B2 | 10/2018 | Vivier | |
| 10,201,939 B1 | 2/2019 | Pare et al. | |
| 10,235,584 B2 | 3/2019 | Leizerson | |
| 2001/0047335 A1 * | 11/2001 | Arndt | G06Q 20/04 705/44 |
| 2003/0179902 A1 * | 9/2003 | Ambrogio | G07F 7/086 382/232 |

(Continued)

OTHER PUBLICATIONS

Krishna, M. B., & Dugar, A. (2016). Product authentication using QR codes: a mobile application to combat counterfeiting. Wireless Personal Communications, 90(1), 381-398. (Year: 2016).*

*Primary Examiner* — Sarah M Monfeldt
*Assistant Examiner* — John S. Wasaff
(74) *Attorney, Agent, or Firm* — Knobbe, Martens, Olson & Bear, LLP

(57) ABSTRACT

Disclosed is a system and method for verifying the authenticity of goods for sale. The system includes an authenticity device on the product which determines a code using a two step authenticity algorithm which inputs time as a variable and outputs the code. The code may be displayed on the authenticity device. The smart device contacts the manufacturer via an application and a wide area network and provides identification information regarding the product. Based on the identification information, the manufacturer finds the copy of the authenticity algorithm stored at the manufacturer, runs the algorithm, and returns the code to the smart device.

21 Claims, 5 Drawing Sheets

(56) References Cited

U.S. PATENT DOCUMENTS

| | | | |
|---|---|---|---|
| 2007/0056041 A1* | 3/2007 | Goodman | H04L 9/3247 |
| | | | 713/182 |
| 2008/0029607 A1* | 2/2008 | Mullen | G06Q 20/3674 |
| | | | 235/492 |
| 2008/0035738 A1* | 2/2008 | Mullen | G07F 7/12 |
| | | | 235/492 |
| 2009/0048971 A1* | 2/2009 | Hathaway | G07F 7/1008 |
| | | | 705/41 |
| 2009/0224060 A1* | 9/2009 | Hatamian | G06Q 20/341 |
| | | | 235/492 |
| 2012/0011070 A1* | 1/2012 | Ward | G06Q 20/34 |
| | | | 705/72 |
| 2012/0089835 A1* | 4/2012 | Peckover | H04L 63/12 |
| | | | 713/168 |
| 2014/0041018 A1* | 2/2014 | Bomar | G06Q 20/385 |
| | | | 726/18 |
| 2014/0258134 A1* | 9/2014 | Park | G06Q 40/02 |
| | | | 705/75 |
| 2015/0312038 A1* | 10/2015 | Palanisamy | G06Q 20/385 |
| | | | 713/155 |
| 2016/0321677 A1* | 11/2016 | Dobaj | G06Q 30/0185 |
| 2017/0169426 A1* | 6/2017 | Warner | G06Q 20/409 |
| 2021/0091939 A1* | 3/2021 | Jabourian | G06K 7/1404 |

* cited by examiner

DYNAMIC ANTI-COUNTERFEIT SYSTEM AND METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND

Field

The present invention relates to security which guarantees the authenticity of goods.

Background

Trade in counterfeit goods is already a large economic problem and is predicted to grow in the coming years. It is estimated by the International Chamber of Commerce that the value of international and domestic trade in counterfeit and pirated goods in 2013 was $710-$917 Billion. The chamber further estimates that the value of domestically produced and consumed counterfeit and pirated goods could range from $524-$959 Billion by 2022. This value impacts both jobs and trade. The value represents market share that authentic goods lose to counterfeit products. While the market share numbers cannot be taken as one for one tradeoffs due to the fact that some consumers buy counterfeit goods either knowing they are counterfeit or are intentionally ignorant of the counterfeit, given that prices for such goods are often well below those of authentic goods. Obviously, given the large value of the market share of counterfeit products, even small recapture of the amount of overall counterfeiting can lead to fairly large dollar impacts for the companies whose goods are being counterfeited.

State of the art in authenticity checks include either anti-tampering visual indicia, or radio frequency identification (RFID) tags. The visual indicia used can be dynamic as disclosed in U.S. Pat. No. 8,978,969. In the '969 patent a two part indicia is disclosed. The bar code is static and printed in a color with high light absorption. In addition to the static barcode a second part of the indicia is printed and either overlaid or underlaid. The second part uses a color with low light absorption, depending on the scanning tool being used. The scanning tools typically use infrared or ultraviolet light. Thus, colors are used which may be visible to the human eye, but do not change the scan of the static portion of the bar code by the scanning tool. The color of the text in the anticounterfeit portion varies with time. Thus, if one label is reproduced, it will not vary with time as does the original, allowing detection as to the counterfeit nature of the label.

Other state of the art systems may use radio frequency identification (RFID) to provide a greater degree of assurance as to the authenticity of the goods. RFID tags, and specifically, passive RFID tags, are low cost items which don't need a power supply of their own. The incoming radio signal provides just enough power for the integrated circuit of the RFID tag to operate. The RFID tag thus powered returns an ID, typically using backscatter. Thus, the antenna of both components, including the passive tag and the interrogator must both be able to send and receive. However, one or more verified purchases can be made, and the RFID tags spoofed. Again, this is possible because the RFID tags are inexpensive, and their ID codes are static once they are created.

For the foregoing reasons, there is a need for an authenticity guarantee system which can defeat the counterfeiting of goods.

BRIEF SUMMARY

Disclosed herein is a system for verifying the authenticity of goods. The system may include an authenticity device. The authenticity device may include a processor, which may be electrically connected to a memory. The memory may have stored on it an authenticity algorithm. The authenticity algorithm may include an authenticity function which may use time as a variable to generate a first authenticity function output. The authenticity algorithm may also include a ruleset which may use the first authenticity function output as an input and may strip at least one predetermined digit from the first authenticity function output to determine a first code. The system may further include an application running on a mobile smart device. The mobile smart device may include a display for displaying a second code. The system may further include a manufacturer server electronically connected to the mobile smart device, the manufacturer server receiving an authenticity check request from the mobile smart device. The manufacturer server may include a second processor electrically connected to a second memory, the second memory including a copy of the authenticity algorithm. The copy of the authenticity algorithm may include a copy of the authenticity function, which may use time as an input and output a second authenticity function output. The copy of the authenticity function may also include a copy of the ruleset, which may input the second authenticity function output and may strip one or more predetermined digits from the second authenticity function output to determine a second code which is output to the mobile smart device. The application running on the mobile smart device may display the second code to verify if the goods are authentic.

Further disclosed herein is a method for creating a code for use in verifying the authenticity of goods. The method may determine a current time by receiving a radio signal on a radio receiver and demodulating the radio signal. The method may input the current time to an authenticity function stored in a memory and executed on a processor. The method may output a set of digits from the authenticity function. The method may further input the set of digits to a ruleset stored on the memory and may execute, on the processor, the ruleset, which may strip at least one digit from the set of digits to generate a code. The method may further output the code to at least one display on an authenticity device.

Further disclosed herein is a system for verifying the authenticity of goods. The system may include an authenticity device. The authenticity device may include a first processor which may be electrically connected to a first memory. The first memory may have stored on it an authenticity function which may execute on the first processor. The authenticity function may use time as a variable and may generate a first authenticity function output. The first memory may also store a ruleset which uses the first authenticity function output as an input and may strip one or more digits from the first authenticity function output. The ruleset may output a first set of digits. The application may substitute letters for one or more of the digits before outputting the code. The system may include an application.

The application may be configured to run on a mobile smart device. The mobile smart device may include a memory which may store the application, a processor which may execute the application, and a wired or wireless adapter which may accessing a wide area network. The system may further include a manufacturer server which may be electronically connected to the wide area network. The manufacturer server may receive an authenticity check request from the application running on the mobile smart device. The manufacturer server may include a second processor electrically which may be connected to a second memory. The second memory may include a copy of the authenticity algorithm. The copy of the authenticity algorithm may include a copy of the authenticity function. The authenticity function may use time as an input and may output a second authenticity function output. The manufacturer server may further include a copy of the ruleset which may input the second authenticity function output and may strip predetermined digits from the second authenticity function output to determine a second code which a user may check against the first code from the authenticity device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
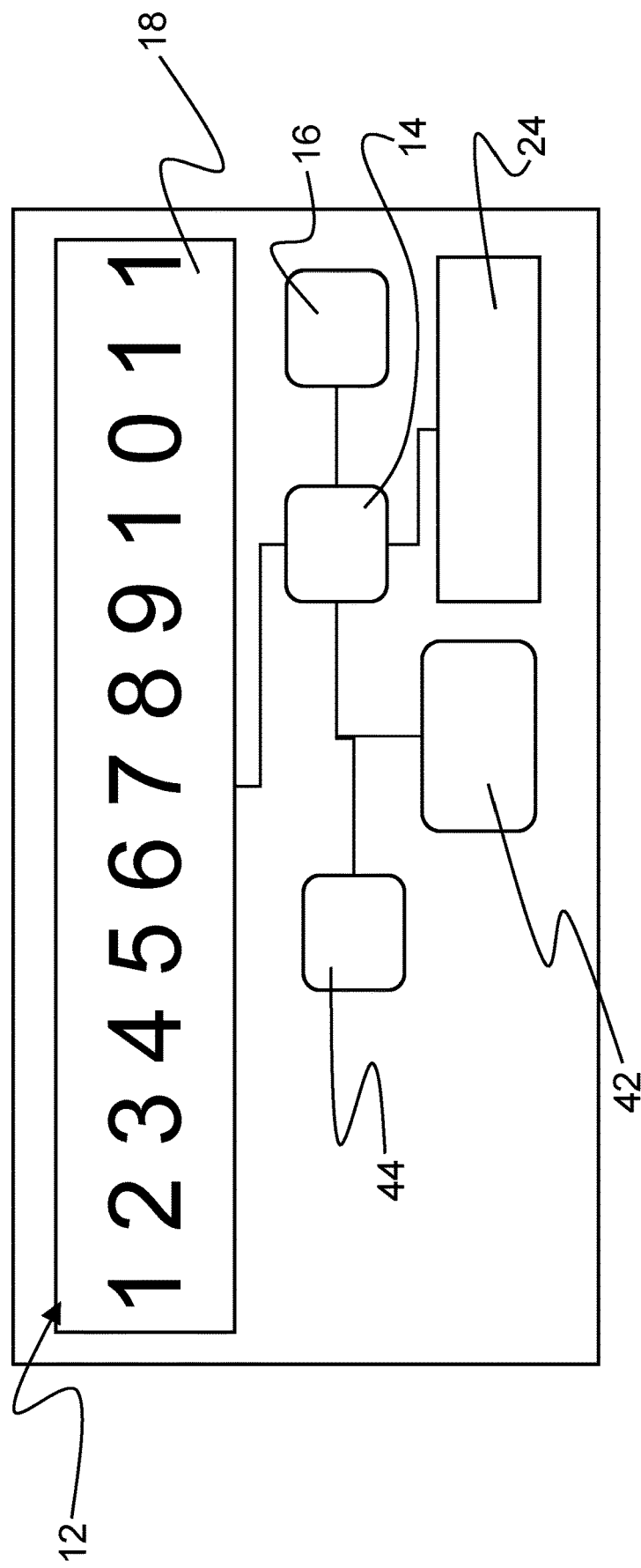
FIG. 1 shows a schematic view of an authenticity device displaying a character code.

The detailed description set forth below in connection with the appended drawings is intended as a description of the presently preferred embodiment of a dynamic anti-counterfeit system and method, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Currently, companies lose billions of dollars annually to the sale of counterfeit goods. Disclosed herein is a system for, and method of, providing a viewable code, for example a character code. That is, the code may include a string of numbers. Alternatively, the code may include letters, or a combination of numbers and letters. Alternatively, the code may be a picture which serves as the code on the goods or the packaging of the goods. Placing the code on the packaging may be most effective when the goods are not easily separated from the packaging. Such viewable codes and number sequences are hereinafter collectively referred to as "the code," or "codes."

The heart of the disclosed dynamic anti-counterfeit system and method consists of an authenticity algorithm of two parts. During a production run, a manufacturer encodes the authenticity algorithm on an authenticity device placed on the product or packaging, and encodes a copy of the authenticity algorithm on a server at the manufacturer. The authenticity device may be placed with the product or packaging. The authenticity device is placed on the product or packaging in addition to a static bar code placed on the packaging for inventory control and transaction purposes.

The authenticity function used in the system may have at least one variable. That variable may be time. Thus, the code generated by either an authenticity device or a server at the manufacturer may be dynamic as a function of time, with the function being revisited at predetermined time intervals. The function may be a linear formula, such as $a(t)+b=x$, with the variable "t" being time, and "a" and "b" being constants. Alternatively, it may be any function the manufacturer wishes to use, and the manufacturer may change the function from product to product or within the same product, for example the manufacturer may associate a particular authenticity algorithm with a particular production run.

The second part of the authenticity algorithm is a rule set that uses the output of the authenticity function output as an input. The ruleset includes instructions which strip certain predetermined digits from the authenticity function output, and either outputs the result to a coding module for encoding as, for example, a character code or a picture code. The digits which are to be stripped may be determined in one of several different ways. As one alternative, the digits to be stripped may be the same for all products manufactured by a manufacturer. By way of example and not limitation, it may be the first three digits of the output result of the authenticity function which are stripped from the output. Alternatively, it is contemplated that non-consecutive digits may be stripped from the output, and that more than three, or fewer than three, digits may be stripped from the output. Further, the number or pattern of digits being stripped may change from product to product or between manufacturing runs of the same product.

While this option provides additional security because of the randomization of the output from the authenticity function it causes, it provides the least additional security of the different embodiments disclosed herein.

As a second alternative, the manufacturer may set instructions as to which digits are to be stripped on a product by product basis. That is, the authenticity function output digits which are being stripped are different for each product manufactured by the manufacturer, or, at least, which digits being stripped are rarely duplicated. Further, a manufacturer may choose to strip different digits for different manufacturing runs of the same product. When different digits are stripped for different production runs of even the same product, additional randomness is introduced to the code, and it becomes harder to predict for a counterfeiter.

As a third alternative, the digits to be stripped may be different for each production run. That is, the manufacturer may assign a digit stripping ruleset to each production run. A production run may be a single product being manufactured on a single production line, or a single product on any number of production lines for a continuous time period. The manufacturer is free to define production runs in any way the manufacturer chooses, and further to assign identification information to those production runs in any way that makes sense for the manufacturer's use. The manufacturer must however, be able to assign at least some identification information to that production run, and to key an authenticity algorithm, including a digit stripping ruleset, to the identification information.

As a fourth alternative, the digits to be stripped may change by time. That is, the digits to be stripped may also be determined by a function, called a stripping function, for which time may be a variable. By way of example and not limitation, the first three digits of the result of the stripping function may be used. If one of the first digits of the output is a repeat of a previous digit, that digit may be skipped, and the next digit used, until all three digits are unique.

To initiate an authenticity check, a user may obtain a code corresponding to the product on a displayed on the authenticity device. To obtain the code, the user operates an application running on a mobile smart device. The application running on the mobile smart device access a server and obtains a corresponding code from the manufacturer via an intervening wide area network, for example, the internet. When the internet is used, the application may be a web browser. By way of example and not limitation, the mobile smart device may be a smart phone, tablet, a laptop, or any other smart device which has a WIFI adapter for joining a wide area network and a display for displaying the codes.

The code is generated at specified time intervals by the authenticity device. For example, the authenticity device may generate a new code every minute. Alternatively, the code may be generated at intervals less than a minute or more than a minute. The code is generated using time as an input to the authenticity function which generates an output, and then the authenticity algorithm continues, taking the output of the authenticity function and stripping certain digits of that output to determine the output code. This process is discussed in detail below.

In addition to the code, the user may also send other information which identifies the particular product the user is trying to authenticate. By way of example and not limitation, the user may choose a product model from a drop-down menu provided in the application. Further, the product or packaging may have identification information printed on it. The manufacturer may determine the identification information at the time of a production run, and key the authenticity algorithm to the identification information, as is discussed in detail below. Such information may be input in an input window in the application. Alternatively, there may be more than one input window in the application, and a portion of the identification information entered in each.

Once the code and identifying information are obtained from the product, or the packaging, or both, the user may perform a check of the code. The user sends the identifying information to the manufacturer, for example, on through the application or on a manufacturer website. The manufacturer first uses the identifying information to determine if matching identifying information is stored on the manufacturer server. If there is matching identifying information on the manufacturer's server, the manufacturer, using the time, generates and sends a code back to the mobile smart device which the user may compare with the code obtained from the product.

Similar to the authenticity device, the manufacturer stores the entire authenticity algorithm keyed to the identification information on a server. That is, the manufacturer stores both the same authenticity function and the ruleset including instructions on which digits of the authenticity function output are to be stripped. Using the time as provided by radio wave as an input, or from an internal timekeeping source which is calibrated periodically by the radio wave, the manufacturer determines the output of the stored copy of the authenticity function, and then uses the stored copy of the ruleset to strip one or more predetermined digits from the output of the authenticity function to determine the output code. The manufacturer sends the code to the smart mobile device. A user may then check the output code against the code shown on the authenticity device on the product. If there is a match, the code is validated, and the user can be almost certain that the goods are authentic.

Figure 2:
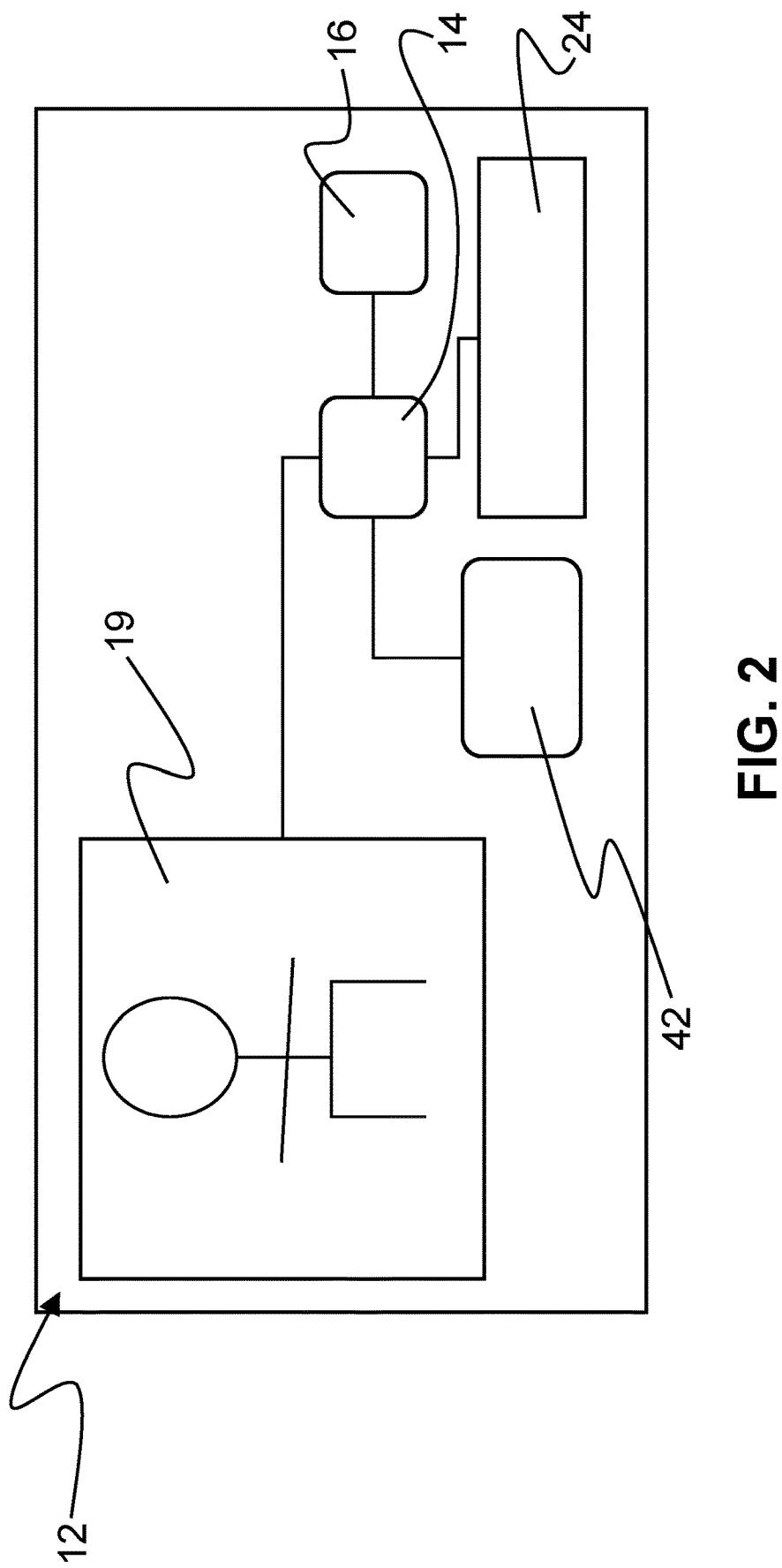
FIG. 2 shows a schematic view of an authenticity device displaying a picture code.

As shown in FIGS. 1 and 2, an authenticity device 12 may include hardware to generate a code and to display the code in order for a user to perform an authenticity check. The authenticity device 12 may include a processor 14 and a memory 16. The memory 16 may include the authenticity algorithm used to create the code and instructions for the code to be output to display 18. The processor 14 and the memory 16 may be electrically connected by wiring, traces on a printed circuit board, or other means known in the art. The display 18 may also be electrically connected to the processor 14 by wiring, traces on a printed circuit board, or other means known in the art.

The authenticity device 12 may further include a radio receiver 24 to receive a radio signal which carries information regarding the correct time. These signals are broadcast from a single source. Most countries have such a broadcast. Because the broadcast is from a single source, it provides a near ideal source of synchronization. The radio receiver 24 may be electrically connected to the processor 14 by wiring, traces on a printed circuit board, or other means known in the art. To provide an example of how such a broadcast may be managed, we may use the example of such a broadcast in the United States. In the United States the broadcast signal originates from a station broadcasting near Fort Collins, Colo. The Fort Collins station includes an antenna array which broadcasts at 60 kHz, 2.5 MHz, 5 MHz, 10 MHz, 15 MHz, 20 MHz, and 25 MHz, at powers varying from 1 kW to 70 kW. The radio receiver 24 may receive one or more of these signals, demodulate the signal to obtain the time data, and pass the time to the processor 14. The processor 14 may use the time to determine the output of the authenticity function as is described further below.

The display 18 for displaying an output of the transaction number may be of any size which allows for viewing by a user so that the user may enter the displayed code in to an application on the mobile smart device. The display 18 may use any of a number of display technologies, including e-Ink displays, liquid crystal displays (LCD), and other technologies known in the art. The display 18 may be electrically connected to the processor 14 by wiring, traces on a printed circuit board, or other means known in the art.

The authenticity device 12 may also include a battery 42. The battery 42 powers the authenticity device 12. The battery 42 may be replaceable, such that if the goods are either warehoused or remain in inventory for long enough for a battery to run out of charge, the battery 42 may be replaced and an authenticity check conducted in the next time interval. Thus, the battery may be of a type typically available in general retail stores, for example a CR2032, LR 44, or similar. The battery 42 may be electrically connected to the other components to provide power to each of the components. The connections may be made by wiring, traces on printed circuit boards, or other methods known in the art.

The authenticity device may have an internal timekeeping device. When the authenticity device is not able to receive the radio signal, the internal time keeping device may continue to keep the time. For example, the authenticity device 12 may have a crystal oscillator 44 which allows for internal timekeeping. However, such internal time keeping devices may be subject to creep in their time keeping, and may have an error, either fast or slow. Thus, after a predetermined period out of contact with the radio signal, the authenticity device 12 may display a message in the display 18 alerting the user to the need to calibrate the clock with the radio signal. For example, the display 18 might display the word "Calibrate" until the authenticity device 12 is calibrated using the radio signal.

Figure 3:
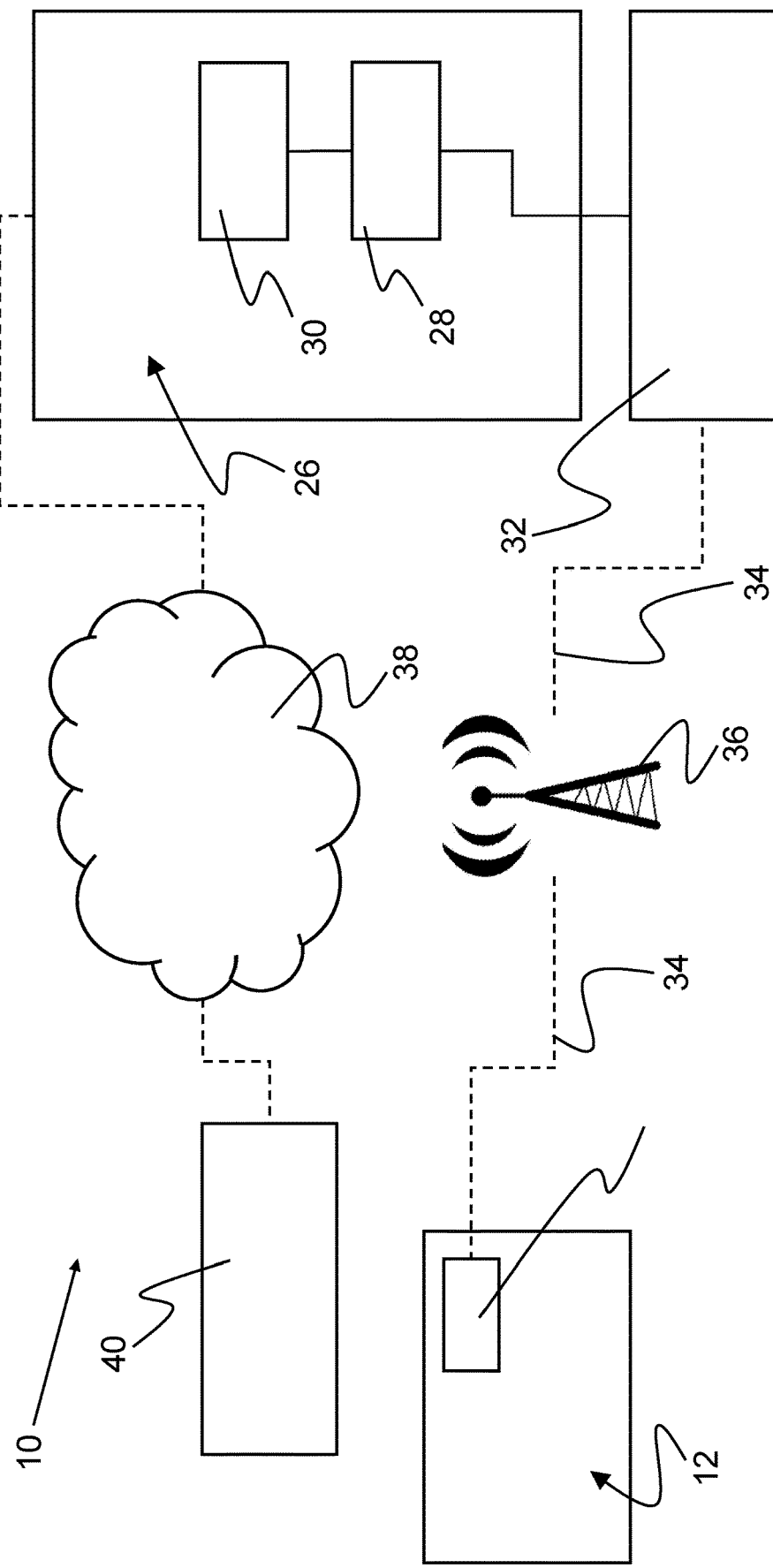
FIG. 3 shows a schematic view of a dynamic anti-counterfeit system.
Figure 4:
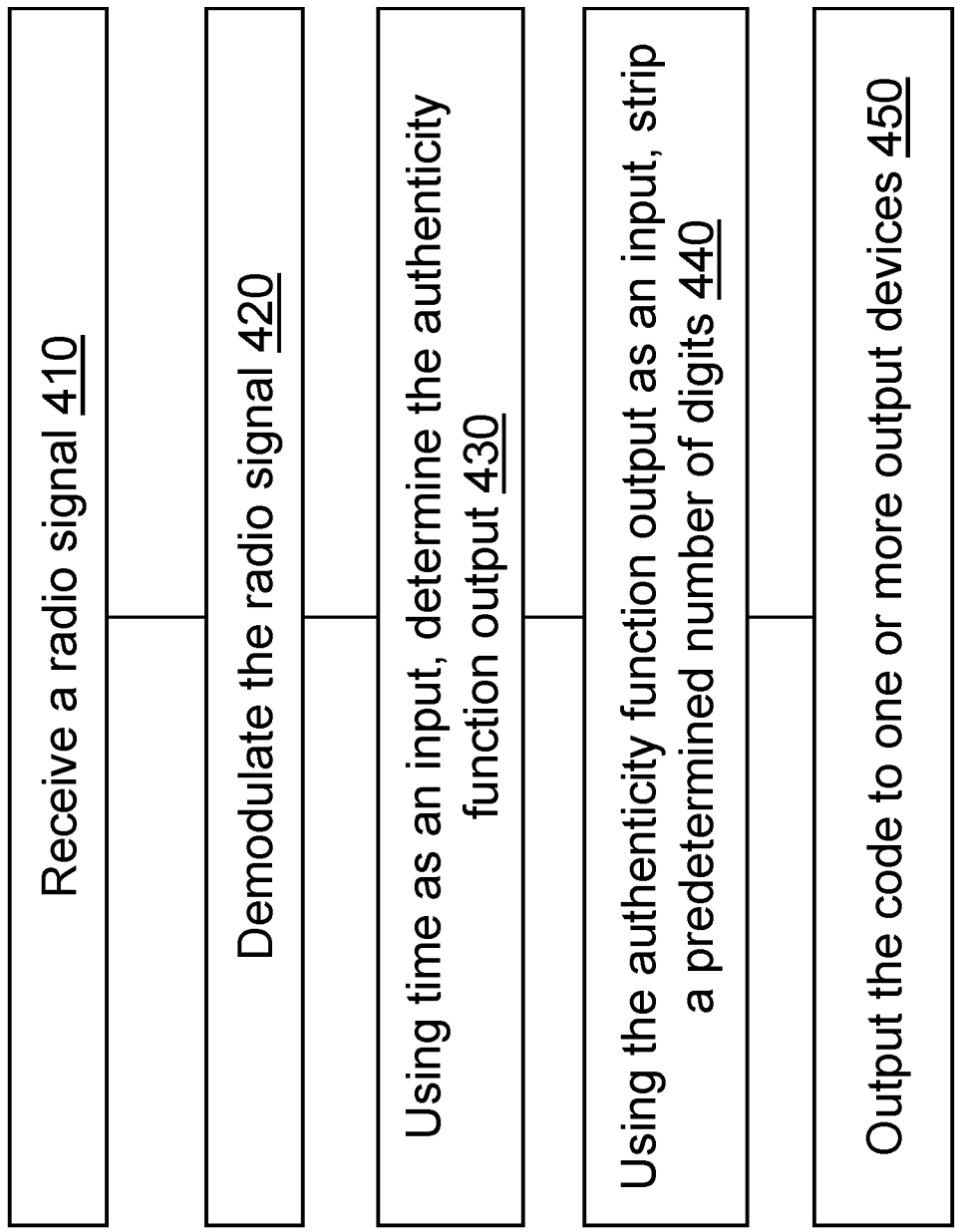
FIG. 4 shows a flowchart of a method of creating a dynamic code.

In reference to FIG. 3, the authenticity device 12 forms part of a system 10. A typical authenticity check will involve a system with at least a user with a mobile smart device, a product at a merchant location, and a manufacturer. The user is typically an individual that may have a mobile smart device 40 in order to perform the check. The mobile smart device 40, having been under the control of the user, is known, to the best of the user's knowledge, to be secure. The mobile smart device 40, along with a wide area network (WAN) 38, for example, the internet, acts as a bridge between the authenticity device and the manufacturer. The messages passed between the mobile smart device 40 and the manufacturer's server 26 on the wide area network 38 may use an encrypted protocol for greater security. The merchant is the entity from which the user wishes to purchase the product, and has the product physically present. The product or the product packaging includes the authenticity device 12. The manufacturer created the product and applied the authenticity device 12, and further holds, on the server 26, a copy of the authenticity algorithm.

The server 26, controlled by the manufacturer may include at least one processor 28 and at least one memory 30. The memory 30 may have records stored thereon. The records may include identification information. The identification information may include some or all of information regarding product models, production facilities, production lines, dates of product runs, and times of product runs. The identification information may include a date code which identifies a date of a production run. As more than one model of product may be manufactured on any particular day, it may also include a time of production, for example, "M" for morning, and "A" for afternoon. By way of example and not limitation, the date code may further include a Julian date and an indicator. The indicator may be used to provide information regarding whether the product was manufactured in the morning or the afternoon, or at a particular facility, or on a particular production line. For example, one code may be "SD211020M." The "SD" may be an indication of the location for a production facility, in this case, it may indicate a San Diego, Calif. production facility. The "2" following the "SD" may indicate production line two. The "110" following the "2" may be Julian date 110, or the 110$^{th}$ day of the year. The "20" following the Julian date may indicate the year 2020. Finally, the "M" may indicate the morning production run.

The server 26 may be electrically connected to a radio receiver 32 through wiring, traces on printed circuit boards, or other means known in the art. The radio receiver 32 may receive longwave radio signals 34 which include information regarding the current time. One common style of radio receiver 32 uses time signals transmitted by dedicated terrestrial longwave radio transmitters, which emit a time code that can be demodulated and further processed by the radio receiver 32, including being displayed or sent as data to other components in a system. The radio receiver 32 may also contain an accurate time base oscillator to maintain timekeeping if the radio signal is momentarily unavailable.

The radio signals 34 may be sent from a central location and modulated to include information as to the current time. The radio signals may be referenced to a very accurate time keeping device, for example, an atomic clock. In the United States, the radio signal used may be that sent from a station 36 broadcasting near Fort Collins, Colo. for example. The Fort Collins station includes an antenna array which broadcasts at 60 kHz, 2.5 MHz, 5 MHz, 10 MHz, 15 MHz, 20 MHz, and 25 MHz, at powers varying from 1 kW to 70 kW. The radio receiver 32 may receive one or more of these signals to determine the time. The radio transmissions contain a time code that may be demodulated and then used as data in the authenticity algorithm, either in authenticity function alone or both the authenticity function and the digit stripping ruleset, as discussed above.

Similar to the authenticity device, the server 26 may also have a device for internal timekeeping as a backup to the radio signal timekeeping. For example, if the radio signal is interrupted for some reason, the server may continue to operate for a period of time using the internal timekeeping until the radio signals once again begin broadcasting. Alternatively, or in addition, if a predetermined time period passes without calibration by the radio signal, the server may use the time code contained in another signal, such as an internet or WiFi® signal.

An advantage of the combination of the use of the radio signal for provision of the time, and pulling that information at every time interval, is that there is no drift. That is, because the authenticity device 12 is synchronized every time interval, and the server 26 at every authenticity check, both are essentially recalibrated to the current time. This eliminates the possibility that an authenticity check will return an incorrect result because either the authenticity device 12 or the server 26 is not synchronized with the radio signal. Further, if either the authenticity device 12 or the server 26 should lose synchronization, for example, if the battery which powers the authenticity device 12 should lose charge, and the authenticity device 12 ceases to function, the authenticity device 12 will resynchronize within a single time interval after the battery is replaced. It is less likely that such an outage will occur with the server 26 because of backup power sources generally in place for server operation. Regardless, the server 26 does not continuously update at every time interval, but synchronizes on an event-driven basis. That is, every time an authenticity check is requested, and the identification information located, the server 26 synchronizes to generate a code to be sent to the mobile smart device 40. This renders it less critical that the server 26 have continuous power.

The server 26 at the manufacturer may be further electronically connected to the WAN 38. The electrical communication across the WAN 38 allows the server to send messages on the network 38 to other devices connected to the WAN 38, for example a router (not shown), which the mobile smart device 40 may use to access the WAN 38. The WAN 38 may be, for example, the internet. The WAN 38 may carry authenticity check requests from the mobile smart device 40 to the server 26. The requests may include identification information for the product, for example, it may include the date code and a model of a product. In order to validate the identification information and return a code, the server 26 may use the processor 28 and instructions stored on the memory 30 to find matching identification information and generate a code as is discussed further below with the operation of the system 10. The server 26 may use the network 38 to send the code to the mobile smart device 40 of the user. The mobile smart device 40, using the application may display the code from the server 26, allowing a user to compare the code with the code displayed on the authenticity device 12.

With reference to FIGS. 1-4, in operation, a manufacturer may decide to undertake a production run at a facility. Prior to the production run, the manufacturer may record certain information regarding the production run. For example, the manufacturer may record the model of product being produced during the production run. The manufacturer may also record identification information. The identification information may include a date. The date may be in a particular format, such as a Julian format. The manufacturer may also record identification information such as a production line or facility code, or a time of day code.

Additionally, the manufacturer may choose a format for the identification information. The format may include some or all of the information recorded above as identification information. As part of the production run, the manufacturer may place the identification information on the product itself, or on the packaging for the product. The identification information may be used to perform an authenticity check as described in further detail below. The identification information, when used in conjunction with an authenticity check, may use the identification information to find the correct authenticity algorithm corresponding to the authenticity check. This identification information, or at least a portion thereof, may be input to a manufacturer website as part of an authenticity check.

Contemporaneously, the manufacturer may key an authenticity algorithm to the identification information, and save the authenticity algorithm and the identification information on the memory 30 of the server 26. The authenticity algorithm may have two steps. The first step includes determining an output from the authenticity function. The authenticity function may be used in determining the code displayed on the authenticity device, as well as generating a copy of the code on the manufacturer server used to validate the authenticity check. The authenticity function may take any of several forms. The authenticity function may be a simple equation. By way of example, and not limitation, the authenticity function may be a linear equation of the form a(t)+b=output, where "t" is time, "a" is a predetermined coefficient, and "b" is a constant, typically a non-zero integer. In order to make the time function properly as an input to the authenticity function, the time may be converted to an alternative format, similar to a Julian date format. For example, the minute starting at midnight to 59 seconds after midnight is the first minute of the day, and thus may be expressed as minute one, and a "1" used as the time in the authenticity function. The following minute may be expressed as minute two, and a "2" used in the authenticity function, and so on until minute 1440. Alternatively, the first minute may be 1440, and the minutes would count down from 1440 to 1. As a third alternative, a random number generator may be used to determine a starting point between 1 and 1440. The time will then increment up to 1440 and then cycle to 1, and back up to one less than the starting point. The same could be done with seconds. If the time interval is to be more than one second, the highest number second in the window may be used. For example, if 30 second intervals are to be used, "30" may be used for the first interval, "60" for the second, and so on.

Alternatively, the authenticity function may use a sine, cosine, or tangent function. The sine, cosine, or tangent function may take the place of the "a" in the line function. Thus, the complete authenticity function may be, for example, sin(t)+b=output. Again, "t" is the time, which may be determined in any of the ways discussed above. The letter "b" represents a constant, typically a non-zero integer.

The transaction number function may be any function the issuer wishes to use, and is not limited to these examples. Some functions may return more randomized results than others, and may be more desirable for that reason. For example, the transaction number function may be a highly oscillating function of one of the following forms:

$$\frac{1}{(x+1)}\sin\left(\frac{\omega}{x^r}\right) \text{ or }$$

$$\frac{-8x}{(x^4+4)}\cos\left(\frac{\omega}{x^r}\right) \text{ or }$$

$$(b)x^2\sin\left(\frac{\omega}{x^r}\right) \text{ or }$$

$$(x-1)\cos\left(\frac{\omega}{x^r}\right)$$

The manufacturer may vary the form of the authenticity function from product to product or production run to production run, or both, or any number of other various ways. This provides improved security in that if one authenticity device is compromised, the form of the authenticity function cannot be determined for the other products with any level of confidence. The authenticity function may also be a discrete function. For example, the function may be t^2+b, where t is time. As discussed above time may be in discrete intervals, for example one minute intervals, meaning for the function t=(1, 2, 3, . . . 1440) for each day.

Alternatively, the authenticity function may be a table stored in memory. For example, if the time interval is one minute, the table may store a predetermined set of digits. Each set of digits may be of a predetermined length. That is, each set of digits may be 20 digits, or 32 digits, or 36 digits in length. Alternatively, the number of digits may be any number of digits from 2 to hundreds of thousands. The exact number of digits chosen may depend on a number of factors, including the requirements of the system which will pass the authenticity code, and the security level desired for the authenticity code.

In creating the table, a random number generator may be used to determine a set of digits. This determination by the random number generator may be made for each entry in the table, ensuring that no entries are consecutive numbers. If the predetermined time interval is one minute, the set of digits may be assigned to minute number 1 in the table. A second set of digits may be determined by the random number generator and assigned to minute number 2 in the table. A third set of digits may be determined by the random number generator and assigned to minute number 3 in the table. This process may continue up to minute 1440 in the table. It is also contemplated that time intervals other than a minute may be used. For example, seconds may be used. In an embodiment where one second is used at the time interval a set of digits may be generated corresponding to every second of the day, from one to 86,400. Time intervals between one second and one minute and more than one minute are also contemplated.

Still further alternatively, the authenticity function may be any function the manufacturer wishes to use, and is not limited to these examples. Some functions may return more randomized results than others, and may be more desirable for that reason. The manufacturer may vary the form of the authenticity function from product to product, or production run to production run, or facility to facility, or however the manufacturers wishes to vary the authenticity algorithm. Varying the authenticity function provides improved security in that if one authenticity function is compromised, the damage is limited to that authenticity function, and the form of the compromised authenticity function cannot be determined for the other accounts.

Regardless of the chosen form of the authenticity function, the authenticity function uses time as a variable, and the generated code is set to change at a predetermined time interval. For example, the time interval may be one minute. This disclosure also contemplates time intervals of more than one minute and time intervals of less than one minute. The technology of the system is able to provide very accurate time intervals due to the precise nature of the radio broadcast and the regular re-calibration, but any time interval chosen must take in to account the time required for an authenticity check to be sent over the wide area network 38, and for the manufacturer server 26 to return a code to be compared to the original by the mobile smart device 40. This process, is, of course, not instantaneous, but in most circumstances will take less than a minute. Thus, the time interval must at least be long enough for the authenticity check to pass through the wide area network and the code to be returned to the mobile smart device.

Figure 5:
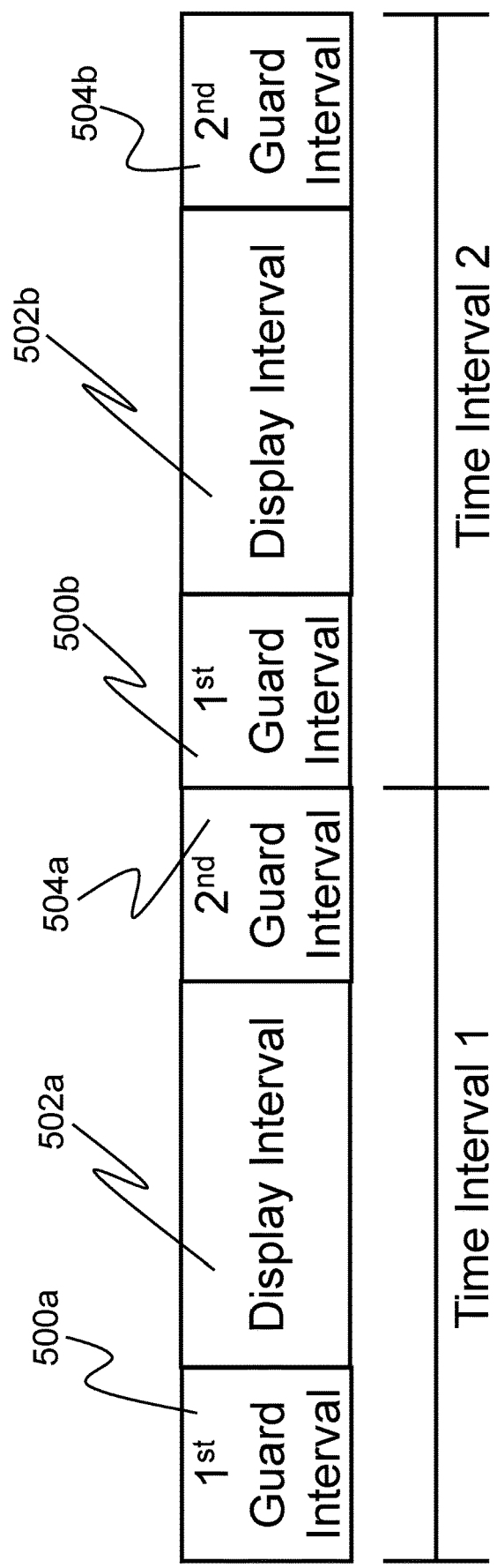
FIG. 5 shows a schematic diagram of the timing of the system.

As shown in FIG. 5, in order to ensure that there are no false positives, that is, a code from the previous time interval is returned by the server, but the next time interval has already been entered by the authenticity device, and thus, the codes do not match, the system may divide the time interval in to one or more guard intervals and a display interval. For example, if the time interval is one minute, the time interval of one minute may be divided in to a first 15 second guard interval 500*a* during which no code is displayed, a 30 second display interval 502*a* during which a code is displayed, and a second 15 second guard interval 504*a* in which no code is displayed. A subsequent, second time interval may also be divided in to a first 15 second guard interval 500*b*, during which no code is displayed, a 30 second display interval 502*b* during which a code is displayed, and a second 15 second guard interval 504*b* during which no code is displayed.

On the server side, the same divisions of time intervals are maintained. That is, the server also divides an exemplary one minute time interval in to a first 15 second guard interval, a 30 second display interval, and a second 15 second guard interval. However, the server does not display codes per se. Rather, the server processes authenticity checks and returns codes to smart devices. Thus, when an authenticity is sent to the server, and the server receives that authenticity check in a guard interval, the server holds that request until the guard interval in which the request was received, and any subsequent guard interval passes, and then processes the request in the next display interval. For example, if the server receives an authenticity check in the second guard interval, the server will hold that check for the second guard interval and the first guard interval of the next time interval, and then process the check during the display interval of the next time interval. The server will return the code to the smart device during the display interval, and the user may check the code versus the code displayed on the authenticity device.

Returning to the code generation process, next, the authenticity algorithm moves to the second step. Using the entirety of the output from the authenticity function, the output is reviewed against a rule set, which may also be termed a set of instructions. The ruleset requires that certain digits within the output from the authenticity function be stripped. As one alternative, this ruleset may take a form consistent across all production runs. That is, the ruleset may require that all versions of the ruleset must strip predetermined digits of the output from the authenticity function, and use the resulting set, alternately termed a remaining set, of digits as the code. By way of example and not limitation, the ruleset may require that the first three digits must be stripped. After stripping the first three digits, the remaining digits may form the code. This disclosure also contemplates stripping fewer than three digits, and more than three digits. Moreover, there is no requirement that the digits to be stripped be consecutive. It may also be that the ruleset only provides as much of the output of the authenticity function as needed to determine the code. That is, if the resulting code is to be 35 digits, and five digits are to be stripped, then 40 digits are provided. This ruleset is encoded with the corresponding identification information on both the server 26 and on the authenticity device 12 as part of the instructions to determine a code. The code is displayed on the authenticity device 12 for the predetermined time period.

As another alternative, the authenticity function outputs a result, which may have the number of digits truncated by further instructions.

The authenticity algorithm may be keyed such that each production run includes a separate ruleset which strips different digits from the output, or, at least, rarely duplicates which digits are stripped. In this embodiment, when the manufacturer initiates a production run, a method may be used to determine which digits will be stripped from the output of the authenticity function for that production run. For example, a random number generator may be used to determine which digits will be stripped. If the random number generator returns any duplicate digits within the result from the random number generator, then the generator may be instructed to run again, until a result with no duplicate digits is returned by the random number generator. For example, if four digits are being stripped, then the random number generator might return a four-digit number, for example, 3273. Because the number three appears twice, such a result instructs the processor 28 to run the random number generator again. The second time, the random number generator returns the number 8235. Because none of the digits repeat, an instruction to strip the second digit, the third digit, the fifth digit, and the eighth digit of the authenticity function output is encoded keyed to the identification information for the production run on the memory 30. The same authenticity algorithm is encoded on the authenticity device 12. The ruleset is applied to the output of the authenticity function in the second step of the authenticity algorithm to determine the code. The code may be displayed on the authenticity device 12 for the predetermined time period.

As yet another alternative, the digits to be stripped may change with each time interval. That is, the digits to be stripped may be determined by a digit stripping function for which time is a variable. If the result of the digit stripping function includes one or more digits which are repeats of a previous digit, that digit may be skipped, until all three are unique, in a manner similar to the random number generator above, but rather than doing an initial random number generation and applying it to every time interval, this embodiment applies a new result of the digit stripping function for each time interval. For example, the digit stripping function may return a result where the first five digits are 43469. Thus, the result can accommodate stripping three, four, or five digits, depending on the chosen ruleset.

The above result would mean that the third, fourth, and fourth digits are to be stripped if just three digits are being stripped, and the third, fourth, fourth, and sixth digits are to be stripped if four digits are being stripped, and third, fourth, fourth, sixth and ninth digits of the transaction number function output are to be stripped if five digits are being stripped. Obviously, the fourth digit is repeated in the relevant output for each of the above examples. Accordingly, the ruleset would deal with the case of three or four digits being stripped by moving from the repeated digit to the next digit and then onward beyond the next digit if required. In the case of a five-digit strip ruleset, output would be increased to allow for possible repeat digits. Thus, if five digits are being stripped, at least six, and likely seven or more digits to ensure enough alternative digits are available in the circumstance that there are more than one repeat digits. The ruleset, including the determined digits, is applied to the output from the authenticity function, the application of the ruleset determining the code. The code is displayed on the authenticity device 12 for the predetermined time period. Because the determination of the code is not instantaneous, the authenticity algorithm may start before the previous time interval is over. In this way, a new code is immediately available at the start of a new time interval. In these embodiments, the identification information may include a time identifier in order for the server 26 to return a proper code.

Alternatively, if the digit to be used as determined in the third or fourth embodiments is a one, two, or three, or any digit up to a first digit of the total number of possible data required to produce a code, a special case may occur. Using the case of a character code, and just one, two, and three as examples, as one possibility of the ruleset, the one, two, or three may indicate that the first, second, or third digit of the output from the authenticity function is to be stripped. However, at least in the case of the code being a character code, the randomized portion of the code includes 35 digits. The tenth through thirty fifth digits would never be stripped from the output if this was on the only way the "1," "2," or "3" were interpreted. Further, were the "1," "2," or "3" always interpreted as the first, second, or third digits respectively, security of the code would be somewhat limited, because the digit stripping would be less random.

However, this disclosure provides an alternate way for interpreting a "1," "2," or "3" which occurs in the results of either the random number generator or the digit stripping function. The "1," "2," or "3" digits may be combined with the next digit to get a number between 10 and 35. If the next digit in output forming the two-digit combination creates a number greater than 35, it may be passed over until a digit after the three less than six is found. There may be some termination rule added to the ruleset concerning to moving to further digits in an attempt to find a non-repeating digit. For example, if three digits in a row are six or greater, the ruleset may require that no further searching of digits is allowed, and the digit is interpreted as a "1," "2," or "3" representing the first, second, or third digits of a series. This disclosure also contemplates review of fewer than three digits and review of more than three digits for this rule. Further, as noted above, digits 4-9 may also be considered for inclusion in the "tens" position, as described for "1," "2," and "3" above.

The entirety of the authenticity algorithm, that is, both the authenticity function and the ruleset regarding stripping predetermined digits may be placed on the authenticity device 12. At or before the predetermined time interval, the authenticity device 12 uses the received time to run the authenticity algorithm, determining an output from the authenticity function, and then uses that output, along with the rule requiring the stripping of certain digits of that output to determine the code for that time interval. If the code is not used during that time interval, it is discarded.

One type of code that may be used is a character code. Such codes may include a combination of characters. The characters may be numbers. Alternatively, the characters may be letters. Still further alternatively, the code may include a combination of numbers and letters. When using letters, the authenticity algorithm may include a step after the digit stripping where numbers are transposed to letters. For example, one or more numbers may be used to represent the place in the alphabet which is taken by a particular letter. For example, an "A" may be substituted where there is a "1" in the code, a "B" where there is a "2" in the code and so on up to a "Z" when there is a 26 in the code. Of course, the "26" may be the consecutive digits "2" followed by "6" in a manner similar to that discussed above in regard to digit stripping.

A second type of code that may be used is a picture code. The authenticity database may include a library of pictures with each picture corresponding to a particular set of digits. The pictures and the corresponding set of digits may be stored in a database. As shown in FIG. 2, the picture corresponding to the digits may be displayed on a display 19 of the authenticity device, rather than the set of digits. Picture codes may prove easier for user's to visually match when compared to long strings of digits and may be preferred for this reason.

In a typical authenticity check, the user may initiate the process by connecting with a server 26 to attempt to obtain a matching code to that displayed on the authenticity device 12. It should be noted that the authenticity device does not communicate with the manufacturer server. Only the smart device communicates with the manufacturer server, and the user may visually compare the code sent to the smart device with the code displayed on the authenticity device. In any embodiment, prior to the initiation of an authenticity check, as seen in FIGS. 1-4, the authenticity device 12 receives a radio signal in step 410. The authenticity device 12 demodulates that radio signal to obtain information regarding the current time in step 420. At the next time interval, the authenticity device 12 executes the authenticity algorithm by using time as an input to the authenticity function, generating the authenticity function output in step 430. Also prior to initiating an authenticity check, the authenticity device 12, using the authenticity function output as an input, applies the ruleset to strip a predetermined number of digits from the output to determine a code, as is shown in step 440. Additionally, the authenticity algorithm may transpose some digits to letters as discussed above. In step 450, the code is output to the display 18.

As an alternative, in embodiments where a picture code is being used, the picture associated with the digits is displayed. The authenticity algorithm includes the further step of inputting the code to the database to match the code with the digits of a picture code, and then displaying the picture code.

A user may initiate an authenticity check by connecting to the manufacturer server 26 with the mobile smart device 40. The mobile smart device 40, as part of the authenticity check, requests that the user enter identification information from the product on which the user wishes to make an authenticity check. The mobile smart device 40 may then transmit the identification information to the manufacturer over the wide area network 38.

The wide area network 38 carries the authenticity check to the manufacturer's server 26 and requests a code corresponding to the identification information. Once communication is established between the mobile smart device 40 and the manufacturer server 26, the mobile smart device 40 provides the identification information. The manufacturer's server 26 uses the identification information to determine if the manufacturer has a matching identification information stored in a record. If the manufacturer does not, the manufacturer server 26 returns a message to the mobile smart device 40 stating that there is not a match for the provided identification information. If the manufacturer does have a record including matching identification information, then the authenticity check proceeds to a code provision step.

In the next step of the authenticity check, the manufacturer server 26, using the time received and demodulated by the radio receiver, runs the authenticity algorithm keyed to the identification information. First, the manufacturer's server 26 runs the authenticity function to generate an output of the first step of the authenticity algorithm. On the manufacturer server 26, the manufacturer outputs the result of the authenticity function to the next step in the authenticity algorithm, namely, digit stripping. The ruleset keyed to the identification information and stored on the server memory 30 is executed by the processor 28 on the server 26, and the processor 28 strips the digits from the output of the authenticity function. If letters are being used in a character code or if a picture code is being used the corresponding steps are performed to generate that code. The manufacturer server 26 then provides the result to the mobile smart device 40 using the wide area network 38.

After the mobile smart device receives the code from the manufacturer server 26, the user may perform a visual comparison of the code obtained from the product and the code obtained from the manufacturer server 26. If there is a match, the goods are almost certainly authentic. If there is not a match, the goods are likely not authentic.

In performing the authenticity check, the manufacturer takes the received time information from the radio signal, and inputs that information in to the authenticity function. Because there is a single source for the radio signal, for example the broadcast from Fort Collins, Colo., the time used by the authenticity device 12 and the time used by the manufacturer server 26 are very closely synchronized. The predetermined time interval length is critical in facilitating the authenticity checks. If the predetermined time interval is too short, the time it takes to the authenticity check to go through may cause the system to move beyond the current time interval, yielding a non-matching code. Such a "false positive," that is, an outcome where the goods are authentic, but the application returns a non-authentic result because the code determined by the authenticity device 12 and the code determined by the manufacturer server 26 were determined in two different time intervals. While such results are nearly impossible to avoid on occasion, choosing a long enough time interval should avoid most occurrences. False positives are only attributable to such circumstances as because there is only a single broadcast, the time used by the authenticity device 12 and the manufacturer server 26 are the same, or within thousandths of a second.

The above description is given by way of example, and not limitation. Given the above disclosure, one skilled in the art could devise variations that are within the scope and spirit of the invention disclosed herein, including various ways of forming the authenticity function. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for verifying the authenticity of goods, comprising:
    an authenticity device including a processor electrically connected to a memory, the memory having stored on it instructions configured to execute an authenticity algorithm, the instructions, when executed by the processor, configured to at least:
        predetermine, based on the authenticity algorithm, at least one digit to be removed from a first authenticity function output prior to the output of the first authenticity function output;
        generate, based on a first time, the first authenticity function output comprising a plurality of digits; and
        remove the at least one predetermined digit from the first authenticity function output to generate a first code;
    mobile smart device including a display to display a second code;
    a server electronically connected to the mobile smart device, the server receiving an authenticity check request from the mobile smart device, the server including:
    a second processor electrically connected to a second memory, the second memory including a copy of second instructions configured to execute the authenticity algorithm, the second instructions, when executed by the second processor, configured to at least:
        predetermine, based on the authenticity algorithm, the at least one digit to be removed from a second authenticity function output prior to the output of the second authenticity function output;
        synchronizing the authenticity function and the copy of the authenticity function such that the authenticity algorithm, when executed by the second processor, obtains the first time;
        generate, based on the first time, the second authenticity function output; and
        remove the at least one predetermined digit from the second authenticity function output to generate the second code; and
    transmit the second code to the mobile smart device;
    wherein the authenticity function and the copy of the authenticity function are synchronized by using a plurality of time intervals contained in a radio signal, the radio signal being demodulated and time data obtained from the demodulated time intervals input to both the authenticity device and the server.

2. The method of claim 1, wherein the radio signal containing the time data is broadcast from a single transmitter or a plurality transmitters.

3. The method of claim 1, wherein the mobile smart device provides identification information found on the goods or the packaging of the goods to the server.

4. The method of claim 3, wherein the identification information is keyed to the copy of the authenticity algorithm on the server.

5. The method of claim 2, wherein each of the plurality of time intervals is divided in to a first guard interval, a display interval, and a second guard interval.

6. The method of claim 1, wherein the instructions, when executed by the processor, are further configured to at least randomly select a set of digits independently determined for each time interval to be stripped.

7. The method of claim 1, wherein the first code and second code are picture codes.

8. The system of claim 1, wherein the instructions, when executed by the processor, are further configured to at least:
receive an indication of a product associated with the authenticity device, wherein predetermining the at least one digit to be removed from a first authenticity function output is based at least in part on the indication of the product.

9. A computer-implemented method for creating a code for use in verifying the authenticity of goods, comprising:
determining a current time by receiving a radio signal on a radio receiver and demodulating the radio signal;
using a remote authenticity device comprising an authenticity algorithm:
predetermine, based on the authenticity algorithm, at least one digit to be removed from a first authenticity function output prior to the output of the first authenticity function output;
generate, based on the current time, the first authenticity function output comprising a plurality of digits; and
remove the at least one predetermined digit from the first authenticity function output to generate a first code; and
using a remote server comprising the authenticity algorithm:
inputting the current time to a second authenticity function stored in a memory and executed on a processor of the remote server;
predetermine, based on the authenticity algorithm, the at least one digit to be removed from a second authenticity function output prior to the output of the second authenticity function output;
synchronizing the first authenticity function and the second authenticity function such that the remote server obtains the current time;
outputting, based on the current time, a set of digits from the second authenticity function;
inputting the set of digits to a ruleset stored on the memory;
removing the at least one predetermined digit from the set of digits to generate a code; and
transmitting the code to at least one display on the remote authenticity device;
wherein the first authenticity function and the second authenticity function are synchronized by using a plurality of time intervals contained in a radio signal, the radio signal being demodulated and time data obtained from the demodulated time intervals input to both the remote authenticity device and the remote server.

10. The method of claim 9, wherein the radio receiver, memory, processor and display are all part of a single device.

11. The method of claim 9, further comprising, after the step of removing the at least one predetermined digit, inputting the code to a database to determine a matching picture code.

12. The method of claim 9, wherein the ruleset strips a static set of digits from the set of digits.

13. The method of claim 9, wherein the ruleset dynamically determines a set of digits to strip for each time interval.

14. A system for verifying the authenticity of goods, comprising:
an authenticity device including:
a first processor electrically connected to a first memory, the first memory having stored on it an authenticity function executing on the first processor which predetermines one or more digits to be removed from a first authenticity function output prior to the output of the first authenticity function output and uses a first time to generate the first authenticity function output, and a ruleset which uses the first authenticity function output as an input and strips the one or more digits from the first authenticity function output, the ruleset outputting based on the first time, a first set of digits and substituting some letters for one or more of the digits before outputting the code;
an application configured to run on a mobile smart device, the application including instructions for connecting to wide area network, the mobile smart device including a memory for storing the application, a processor for executing the application, and a wired or wireless adapter for accessing the wide area network;
a server electronically connected to the wide area network, the server receiving an authenticity check request from the application running on the mobile smart device, the server including:
a second processor electrically connected to a second memory, the second memory including a copy of the authenticity algorithm, the copy of the authenticity algorithm including:
a copy of the authenticity function using the first time as an input and outputting a second authenticity function output and determining the predetermined digits to be removed from the second authenticity function output prior to the output of the second authenticity function output; and
a copy of the ruleset which inputs the second authenticity function output and strips the predetermined digits from the second authenticity function output to determine, based on the first time, a second code and authenticate the first code from the authenticity device by comparing it with the second code;
wherein the authenticity function and the copy of the authenticity function are synchronized by using a plurality of time intervals contained in a radio signal, the radio signal being demodulated and time data obtained from the demodulated time intervals input to both the authenticity device and the server.

15. The system of claim 14, further comprising a first radio receiver electrically connected to the first processor and a second radio receiver electrically connected to the second processor, the first radio receiver and second radio receiver receiving a radio signal including information providing the current time.

16. The system of claim 15, wherein the current time is continuously sent to the first processor for use in the authenticity function and second processor for use in the copy of the authenticity function.

17. The system of claim 14, wherein the ruleset strips a static set of digits in each time interval.

18. The system of claim 14, wherein an application on the mobile smart device receives the second code, and displays the second code on a display of the mobile smart device.

19. The system of claim 14, wherein the letters are substituted for numbers according to the relationship of the letter's position in the alphabet, with the first position, or one being assigned to the letter A, and the last position, or 26 being assigned to the letter Z.

20. The system of claim 14, further comprising a display electrically connected to the first processor, the display configured to display the output from the authenticity algorithm.

21. The system of claim 14, wherein the code is at least six characters long.

* * * * *